(12) United States Patent  
Jeong et al.

(10) Patent No.: US 9,332,175 B2  
(45) Date of Patent: May 3, 2016

(54) IMAGE PHOTOGRAPHING APPARATUS AND PHOTOGRAPHING METHOD THEREOF

(71) Applicant: SAMSUNG ELECTRONICS CO., LTD., Suwon-si (KR)

(72) Inventors: Jin-gu Jeong, Seongnam-si (KR); Hee-chul Han, Hwaseong-si (KR); Hyun-seok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/168,047

(22) Filed: Jan. 30, 2014

(65) Prior Publication Data

US 2015/0029378 A1    Jan. 29, 2015

(30) Foreign Application Priority Data

Jul. 23, 2013    (KR) .................. 10-2013-0086749

(51) Int. Cl.  
*H04N 5/232*    (2006.01)

(52) U.S. Cl.  
CPC ........... *H04N 5/23216* (2013.01); *H04N 5/232* (2013.01)

(58) Field of Classification Search  
CPC .............. H04N 5/23216; H04N 5/235–5/2353  
USPC ...................................................... 348/333.02  
See application file for complete search history.

(56) References Cited

U.S. PATENT DOCUMENTS

| 2006/0139462 | A1* | 6/2006 | Fukasawa et al. | 348/231.3 |
| 2008/0084398 | A1* | 4/2008 | Ito et al. | 345/173 |
| 2011/0007145 | A1 | 1/2011 | Shigeeda | |
| 2011/0074971 | A1* | 3/2011 | Kwon | 348/222.1 |

OTHER PUBLICATIONS

Communication from the European Patent Office issued May 27, 2015 in a counterpart European Application No. 14152735.8.

* cited by examiner

*Primary Examiner* — Anthony J Daniels  
(74) *Attorney, Agent, or Firm* — Sughrue Mion, PLLC

(57) ABSTRACT

An image photographing apparatus and a photographing method thereof are provided. The image photographing method includes displaying a photographing mode selection user interface (UI), in response to a plurality of photographing modes being selected through the photographing mode selection UI, calculating a final setting value based on a photographing setting value of the plurality of selected photographing modes, and in response to a photographing command being input, photographing an image according to the calculated final setting value.

20 Claims, 6 Drawing Sheets

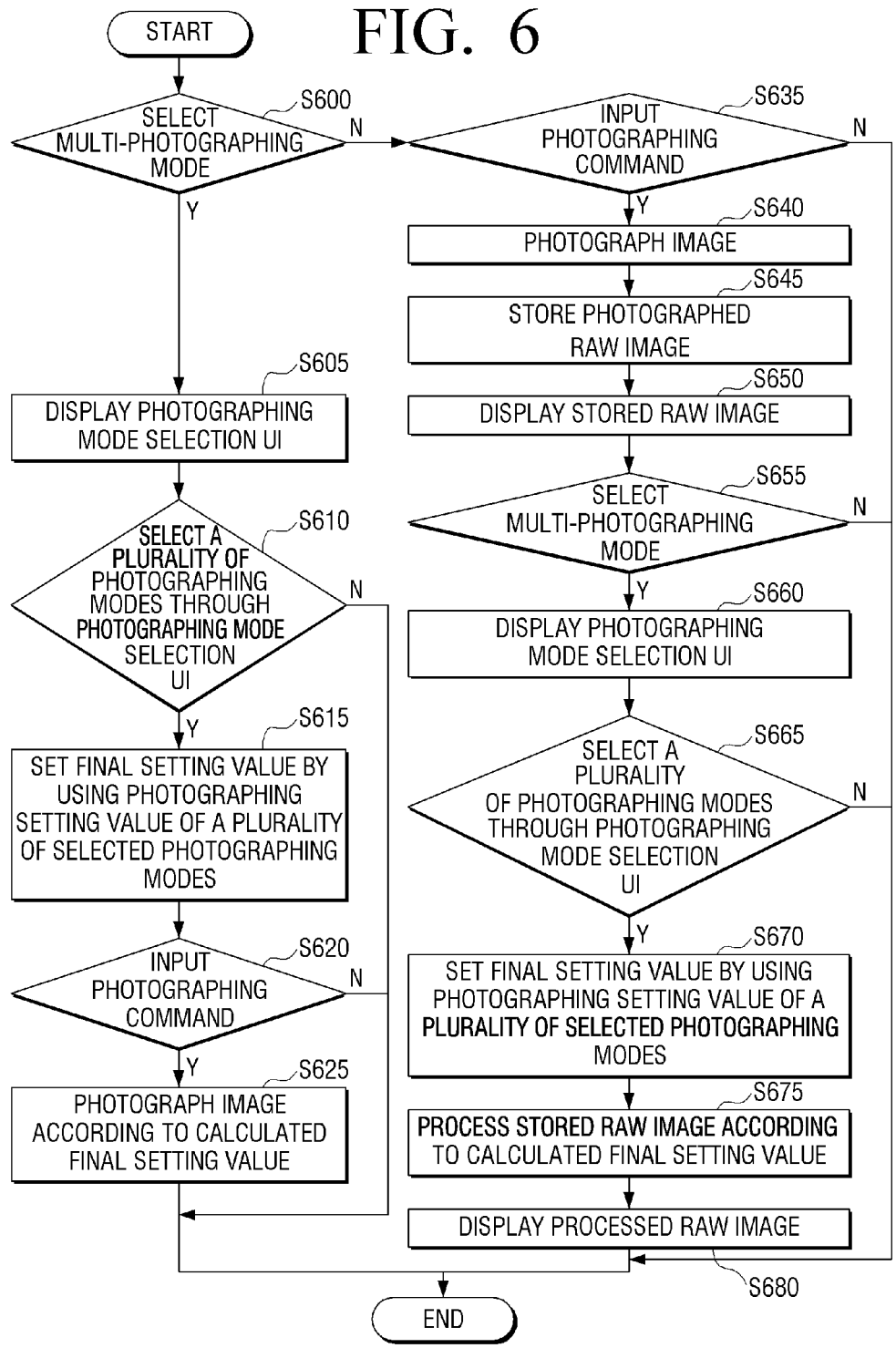

IMAGE PHOTOGRAPHING APPARATUS AND PHOTOGRAPHING METHOD THEREOF

CROSS-REFERENCE TO RELATED APPLICATION

This application claims priority from Korean Patent Application No. 10-2013-0086749, filed in the Korean Intellectual Property Office on Jul. 23, 2013, the disclosure of which is incorporated herein by reference in its entirety.

BACKGROUND

1. Technical Field

Apparatuses and methods consistent with exemplary embodiments relate to a photographing apparatus and a photographing method thereof. More particularly, the exemplary embodiments relate to a photographing apparatus capable of photographing an image through a plurality of photographing modes, and a photographing method thereof.

2. Description of the Related Art

As image photographing apparatuses including an image photographing function (for example, a digital camera, a smart phone, etc.) are widely used, more and more users are photographing images in their daily lives.

A recent image photographing apparatus provides various photographing modes, according to a photographing environment, and each photographing mode stores various setting values for photographing. Accordingly, users may photograph images using a photographing setting value which is appropriate for a photographing environment, by selecting an appropriate photographing mode according to the photographing environment. For example, when a user wishes to photograph an image at night, the user may set a night-view mode as a photographing mode in order to use a photographing setting value which is appropriate to photograph an image at night. Accordingly, the user may conveniently adjust a setting value of an image photographing apparatus, according to a photographing environment, by selecting a photographing mode without changing various settings of the image photographing apparatus on a one by one basis.

However, according to an image photographing apparatus of the related art, a user needs to select one photographing mode even in the case where various photographing modes are applicable according to a photographing environment. For example, when a user wishes to photograph a portrait photo at night, the prior art image photographing apparatus selects one of a night-view mode and a portrait mode.

As the user selects only one photographing mode in a photographing environment which requires various photographing modes, the user faces difficulties in obtaining an optimal photographing setting value in a photographing environment which requires various photographing modes.

SUMMARY

One or more exemplary embodiments provide an image photographing apparatus which photographs an appropriate image according to a photographing environment of a user, as the user selects a plurality of photographing modes and changes a setting value of the image photographing apparatus according to the selected photographing modes, and a photographing method thereof.

According to an aspect of an exemplary embodiment, there is provided photographing method of an image photographing apparatus, the photographing method including: displaying a photographing mode selection user interface (UI), in response to a plurality of photographing modes being selected through the photographing mode selection UI, calculating a final setting value based on a photographing setting value of the plurality of selected photographing modes, and in response to a photographing command being input, photographing an image according to the calculated final setting value.

The photographing may further include detecting a photographing environment of the photographed image, and in response to the photographing command being input, associating and storing the photographing environment detected at a time when the photographing command is input with the plurality of selected photographing modes.

The method may further include in response to the detected photographing environment being the same as a pre-stored photographing environment, recommending the plurality of selected photographing modes corresponding to the pre-stored photographing environment.

The photographing environment may include at least one of a photographing location, a photographing time, a photographing figure, and a movement of an image photographing apparatus at a time of photographing.

The final setting value may be an average value of the photographing setting value of the plurality of photographing modes.

The final setting value may be a value which is calculated by multiplying a different weighted value and each photographing setting value of the plurality of photographing modes and adding the calculated values.

The method may further include displaying an image which is photographed according to the calculated final setting value.

According to an aspect of another exemplary embodiment, there is provided an image photographing apparatus including: a photographing unit configured to photograph an image, a display configured to display an image, an input unit configured to receive a user command, and a controller configured to, in response to a predetermined user command being input through the input unit, control the display to display a photographing mode selection UI, in response to a plurality of photographing modes being selected through the photographing mode selection UI, calculate a final setting value based pm a photographing setting value of the plurality of selected photographing modes, and in response to a photographing command being input through the input unit, control the photographing unit to photograph an image according to the calculated final setting value.

The apparatus may further include a detector configured to detect a photographing environment and a storage, and the controller may be configured to, in response to a photographing command being input, control the storage to associate and store a photographing environment detected through the detector at a time when the photographing command is input with the plurality of selected photographing modes.

The controller may be configured to, in response to a determination that the detected photographing environment is the same as a pre-stored photographing environment, recommend the plurality of selected photographing modes corresponding to the pre-stored photographing environment.

The photographing environment may include at least one of a photographing location, a photographing time, a photographing figure, and a movement of an image photographing apparatus at a time of photographing.

The final setting value may be an average value of a photographing setting value of the plurality of photographing modes.

The final setting value may be a value which is calculated by multiplying a different weighted value and each photographing setting value of the plurality of photographing modes and adding the calculated values.

According to an aspect of another exemplary embodiment, there is provided a photographing method of an image photographing apparatus, the photographing method including: receiving a user command, in response to a photographing command being input, storing a photographed raw image, in response to the plurality of photographing modes being selected through a photographing mode selection UI after photographing, calculating a final setting value based on a photographing setting value of the plurality of selected photographing modes, and processing and displaying the raw image according to the calculated final setting value.

BRIEF DESCRIPTION OF THE DRAWINGS

The above and/or other aspects will be more apparent by describing certain exemplary embodiments with reference to the accompanying drawings, in which:

FIGS. 5 and 6 are flowcharts provided to explain a photographing method of an image photographing apparatus, according to various exemplary embodiments.

DETAILED DESCRIPTION

It should be observed the method steps and system components have been represented by known symbols in the figure, showing only specific details which are relevant for an understanding of the exemplary embodiments. Further, details readily apparent to persons ordinarily skilled in the art may not have been disclosed. In the exemplary embodiments, relational terms such as first and second, and the like, may be used to distinguish one entity from another entity, without necessarily implying any actual relationship or order between such entities.

Figure 1:
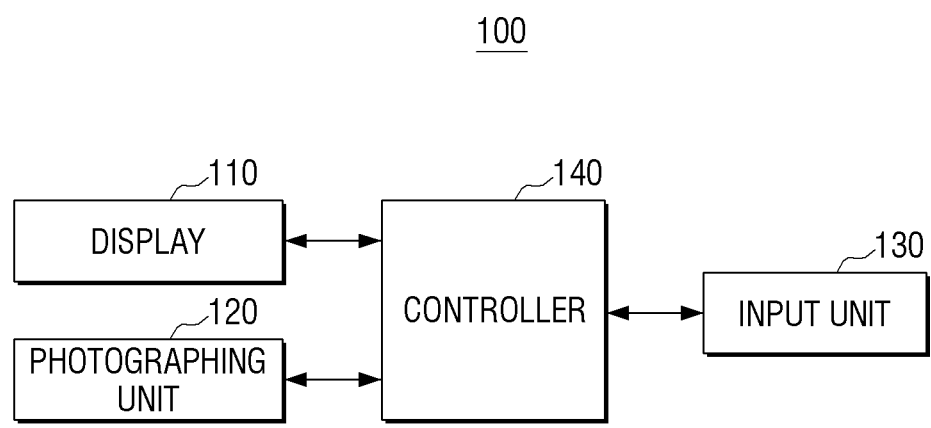
FIG. 1 is a view illustrating a configuration of an image photographing apparatus, according to an exemplary embodiment.

FIG. 1 is a view illustrating a configuration of an image photographing apparatus 100, according to an exemplary embodiment. As illustrated in FIG. 1, the image photographing apparatus 100 comprises a display 110, a photographing unit 120, an input unit 130, and a controller 140. The image photographing apparatus 100 may be implemented as a digital camera, but this is only an example. The image photographing apparatus 100 may be implemented as various electronic apparatuses having a photographing unit 120, such as a camcorder, a smart phone, a tablet personal computer (PC), a notebook PC, a personal digital assistant (PDA), and so on.

The display 110 displays all images photographed through the photographing unit 120. The display 110 may display an image which is currently photographed as a live-view, display an image photographed according to a user's photographing command, or display an image stored in storage 150 as a user downloads the image via wireless communication or connects the image photographing apparatus 100 to another electronic apparatus. In addition, the display 110 may display a user interface to select at least one photographing mode.

The photographing unit 120 photographs an image by converting a light signal input through a lens to an electrical signal through an image sensor.

The input unit 130 receives a user command to control the image photographing apparatus 100. In particular, the input unit 130 may receive a user command to select a plurality of photographing modes, and may calculate and change a setting value of the image photographing apparatus 100. When the input unit 130 includes a touch panel, a user may select a plurality of photographing modes by touching the input mode 130, but this is only an example. The input unit 130 may include one or more buttons, but is not limited thereto.

The controller 140 controls overall operations of the image photographing apparatus 100 according to a user command input through the input unit 130.

Specifically, the controller 140 controls the display 110 in order to display photographing mode selection UI 310, and in response to a user selecting at least one photographing mode through the photographing mode selection UI 310, the controller 140 calculates a final setting value using a photographing setting value which is appropriate for each of the selected photographing mode. The photographing setting value may include an iris value, sensitivity, a shutter speed, etc. which may be adjusted when the image photographing apparatus 100 photographs an image.

For user convenience, the image photographing apparatus 100 provides photographing modes which are used frequently by users, and the range of photographing setting values are set according to a photographing mode. Accordingly, in response to a user selecting at least one photographing mode, a final setting value may be calculated using a predetermined photographing setting value in each photographing mode. The final setting value may be calculated using an average value of predetermined photographing setting values in each photographing mode, but this is only an example. The final setting value may be calculated using other calculating methods.

That is, a final setting value may be calculated by multiplying a different weighted value and each of a photographing setting value of a plurality of photographing modes and adding the values.

For example, if a user selects mode A and mode B, the iris value of mode A may be 1~2, the sensitivity may be ISO 100~200, and the shutter speed may be 1/300~1/100, and the iris value of mode B may be 11~13, the sensitivity may be ISO 50~100, and the shutter speed may be 1/4~1/2. Herein, mode A and mode B may be one of a night mode, a portrait mode, a landscape mode, a close-up mode, a night-view mode, a backlight mode, a tripod mode, and an exercise mode.

In general, if a user simultaneously selects mode A and mode B, the final setting values of the iris value, the sensitivity, and the shutter speed of mode A and mode B may be calculated to be 6~7, ISO 75~150, and 19/150~51/200, respectively, by calculating average values thereof.

In addition, if a user selects mode A and mode B by giving a weighted value of 0.8 to mode A and a weighted value of 0.2 to mode B, final setting values may be calculated by multiplying 0.8 and each setting value of mode A and multiplying 0.2 and each setting value of mode B and then, adding the calculated values.

Specifically, as 0.8 is multiplied with each setting value of mode A, the iris value, the sensitivity and the shutter speed of mode A may be calculated to be 4/5~8/5, ISO 80~160 and 1/375~1/125, respectively, and as 0.2 is multiplied with each setting value of mode B, the iris value, the sensitivity and the shutter speed of mode B may be calculated to be 11/5~13/5, ISO 10~20 and 1/20~1/10, respectively. In this case, the final setting values of the iris value, the sensitivity and the shutter speed may be calculated to be 3~21/5, ISO 90~180 and 79/1500~27/250, respectively, by adding the above values of mode A and mode B where the weighted values are multiplied.

In addition, in response to a user inputting a user command to photograph an image through the input unit 130, the controller 140 controls the photographing unit 120 to photograph an image according to a calculated final setting value. For example, in response to a user command to set a night mode as a photographing mode being input through the input unit 130, the controller 140 controls the photographing unit 120 to photograph an image according to the iris values, sensitivity and shutter speed, etc. which are predetermined to be appropriate for a night mode.

Further, the controller 140 may control the storage 250 to associate a photographing environment which is detected through the detector 280 at a time when a user inputs a user command to photograph an image through the input unit 130 with at least one photographing mode selected by the user, and may store the information. For example, in response to a user simultaneously selecting a portrait mode and a night-view mode from among a plurality of photographing modes in Seoul at 20:00 and photographs an image, the controller 140 may control the storage 250 to associate that the user has simultaneously selected the portrait mode and the night-view mode with the place and time of the photographing being Seoul and 20:00, and may store the associated information which has been selected.

In addition, in response to a determination that a photographing environment is the same as a pre-stored photographing environment prior to a user inputting a photographing command to the input unit 130, the controller 140 may recommend to the user a photographing mode which is stored in association with the pre-stored photographing environment. That is, in response to a user starting to photograph an image in Seoul, around 20:00 again, the controller 140 controls the image photographing apparatus 100 to recommend that a user simultaneously select the portrait mode and the night-view mode. Specifically, the controller 140 may control the display 110 to display a message which simultaneously recommends the portrait mode and the night-view mode to the user. When the recommendation message is displayed, the user may input a user command to use the recommended modes, or a user command to remove the recommended message.

Figure 2:
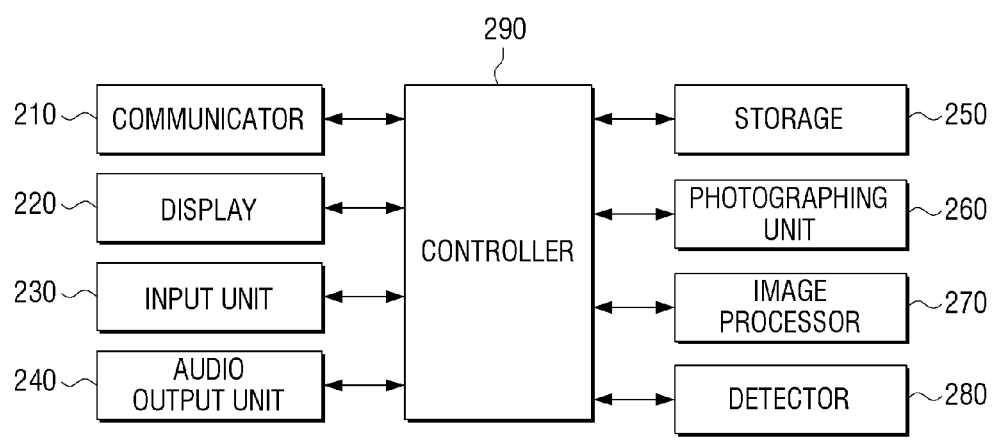
FIG. 2 is a block diagram illustrating a detailed configuration of an image photographing apparatus, according to an exemplary embodiment.

FIG. 2 is a block diagram which illustrates a detailed configuration of an image photographing apparatus, according to an exemplary embodiment. The image photographing apparatus 200 illustrated in FIG. 2 comprises a communicator 210, a display 220, an input unit 230, an audio output unit 240, a storage 250, a photographing unit 260, an image processor 270, a detector 280, and a controller 290.

The display apparatus 200 of FIG. 2 is an apparatus performing various functions such as a communication function, a video reproduction function, a display function, a photographing environment detection function and so on, and each element is described in a comprehensive manner. Thus, depending on the exemplary embodiments, some elements illustrated in FIG. 2 may be omitted or changed, or other elements may be added.

The communicator 210 performs communication with various types of external apparatuses according to various types of communication methods. In particular, the communicator 210 may perform communication with a Cloud system when various setting values and photographed images of the image photographing apparatus 200 are stored using a Cloud service.

The communicator 210 may include various communication chips such as a WiFi chip, a Bluetooth chip, a Near Field Communication (NFC) chip, a wireless communication chip, and so on. In this case, the WiFi chip, the Bluetooth chip, and the NFC chip perform communication according to a WiFi method, a Bluetooth method, and an NFC method respectively. The NFC chip refers to a chip which operates according to an NFC method by using 13.56 MHz from among various RF-ID frequency bands such as 135 kHz, 13.56 MHz, 433 MHz, 860-960 MHz, 2.45 GHz, and so on. When the WiFi chip or the Bluetooth chip is used, various connection information such as an SSID, session key, etc., is received/transmitted in advance so that various information can be received/transmitted using the same. The wireless communication chip refers to a chip which performs communication according to various communication standards such as IEEE, Zigbee, 3rd Generation (3G), 3rd Generation Partnership Project (3GPP), Long Term Evolution (LTE), and so on.

The display 220 displays various images such as an image photographed by the photographing unit 260, an image stored in the storage 250 or the Cloud system, and an image processed by the image processor 270. In particular, the display 220 may display the photographing mode selection UI 310, and in response to a user inputting a user command to select a plurality of photographing modes through the input unit 230, the display 220 may display the photographing mode selection UI 310 where a highlight is placed on selected photographing modes.

The input unit 230 receives a user command to control the image photographing apparatus 200. In particular, the input unit 230 may receive a user command regarding whether to select a multi-photographing mode to select a plurality of photographing modes, and a user command to select a plurality of photographing modes. When the input unit 230 includes realized as a touch panel, a user command may be input through a touch. However, this is only an example, and the input unit 230 may include one or more of a menu button, a shutter button, a text window, and so on.

The audio output unit 240 refers to an element, such as a speaker, which outputs a stored audio, if an image which is photographed and stored in the storage 250 or an image stored in the storage 250 through another route is a moving image.

The storage 250 associates various modules to drive the image photographing apparatus 100, an image photographed through the photographing unit 260, a photographing environment detected through the detector 280 with at least one photographing mode, and store the information.

For example, the storage 250 may store software including a base module, a sensing module, a communication module, a presentation module, a web browser module, and a service module. In this case, the base module refers to a basic module which processes a signal transmitted from each hardware component included in the display apparatus 100, and transmits the processed signal to an upper layer module. The sensing module is a module which collects information from various sensors, and analyzes and manages the collected information. The sensing module may include a face recognition module, a voice recognition module, a motion recognition module, and an NFC recognition module, and so on. The presentation module is a module to compose a display screen. The presentation module includes a multimedia module to reproduce and output multimedia contents, and a UI rendering module for UI and graphic processing. The communication module is a module to perform communication with the outside. The web browser module refers to a module which accesses a web server by performing web-browsing. The service module is a module including various applications for providing various services As described above, the storage 250 may include various program modules, but some of the various program modules may be omitted, changed, or added according to the type and attribute of the display apparatus 100.

In addition, the storage 250 may store necessary values for photographing which are set according to a photographing mode provided by the image photographing apparatus 100, and may store a raw image which is neither stored nor processed according to a pre-stored setting value by the image processor 270. For example, the storage 250 stores a raw image which is not processed when a user inputs a user command not to use a multi-photographing mode for selecting a plurality of photographing modes and then, inputs a photographing command to the input unit 230. Accordingly, in response to a user inputting a user command to a user a multi-photographing mode after storing a raw image, the image processor 270 may perform image-processing with respect to the raw image stored in the storage 250.

In addition, the raw image is an image which has not been image-processed, and the raw image may be stored as a final image unless a user selects the multi-photographing mode again after storing the raw image. In response to a user selecting the multi-photographing mode again after storing the raw image, the storage 250 may store an image which is generated by the image processor 270 image-processing the raw image, according to a plurality of selected photographing modes, and may delete the stored raw image. However, this is only an example, and the storage 250 may store not only the raw image but, may also store the image-processed raw image.

The storage 250 may store preset necessary values for photographing by the image photographing apparatus 100 which varies, depending on the photographing modes. The necessary values for photographing may include iris value, sensitivity, shutter speed, white balance, and so on. For example, the iris value, sensitivity and shutter speed of mode A may be set to be 1~2, ISO 100~200 and 1/300~1/100, respectively, and the iris value, sensitivity and shutter speed of mode B may be set to be 11~13, ISO 50~100 and 1/4~1/2, respectively. Herein, mode A and mode B may be one of a night mode, a portrait mode, a landscape mode, a close-up mode a night-view mode, a backlight mode, a tripod mode, and an exercise mode. That is, the storage 250 may store a representative setting value so that a user does not have to set each of the necessary values for photographing according to a photographing mode.

The photographing 260 includes a shutter, a lens an iris, a Charge Coupled Device (CCD) image sensor and an Analog/Digital Converter. The shutter is a device to adjust the amount of an exposed light along with the iris. The lens processes an image by receiving a light from an external light source. In this case, the iris adjusts the amount of the incident light according to the degree of opening/closing the iris. The CCD image sensor accumulates the amount of light input through the lens, and outputs an image photographed by the lens in accordance with a vertical sync signal according to the accumulated amount of light. The image photographing apparatus 100 may obtain an image through the CCD image sensor which converts a light reflected and emitted from a subject into an electrical signal. In order to obtain a color image using the CCD image sensor, a color filter is necessary, and a filter called a Color Filter Array (CFA) is employed in most cases. However, the exemplary embodiments are not limited thereto. The CFA transmits a light representing only one color for each pixel and has a regularly-arranged structure, and has various forms depending on arrangement structures. The ADC converts an analog image signal output from the CCD image sensor to a digital signal.

Photographing an image by the photographing unit 260 as described above is only an example, and an image may be photographed using other methods. For example, an image may be photographed using sensors other than the CCD image sensor, such as a Complementary Metal Oxide Semiconductor (CMOS) image sensor.

The image processor 270 performs signal-processing so as to display raw data which is digital-converted under the control of the controller 290. The image processor 270 removes a black level caused by a dark current in the CCD image sensor and the CFA filter which are sensitive to changes in temperature. The image processor 270 performs gamma correction which encodes information according to the non-linearity of human vision. The image processor 270 performs CFA interpolation which interpolates an RGRG line of a data for which gamma correction is performed and a bayer filter pattern is implemented as a GBGB line into an RGB line. The image processor 270 converts the interpolated RGB signal into a YUV signal, performs edge compensation for clarifying an image by filtering a Y signal with a high-band filter and color correction for correcting color values of U and V signals using a standard color coordinates, and removes noise therefrom. The image processor 270 generates a JPEG file by compressing and signal-processing Y, U and V signals where noise is removed, and the generated JPEG file is displayed on display 220 and stored in storage 250.

In addition, the image processor 270 may process an image according to a necessary value for photographing which is predetermined according to a photographing mode. That is, the storage 250 stores iris value, sensitivity, shutter speed, etc. which are necessary for photographing according to each photographing mode and thus, in response to a user inputting a command to select at least one photographing mode to the input unit 230, the image processor 270 processes an image according to the pre-stored necessary values for photographing.

Processing an image by the image processor 270, as described above is only an example, and an image may be processed using other methods.

The detector 280 which may include a temperature sensor, a GPS sensor, a rotation sensor, a motion sensor, etc., may detect a photographing environment. For example, the detector 280 may use the GPS sensor to obtain location information by detecting a place where a user photographs an image, or may detect user motion while the user photographs an image using a rotation sensor or a motion sensor. The various information detected by the detector 280 may be stored in the storage 250.

The controller 290 controls overall operations of the image photographing apparatus 100, according to a user command input through the input unit 230 and photographing environment information which is detected by the detector 280. In particular, the controller 290 controls to change a setting value of the image photographing apparatus 100 according to a user command in order to select a plurality of photographing modes which are input through the input unit 230, and controls the photographing unit 260 to photograph an image according to the changed setting value.

Specifically, the controller 290 controls the input unit 230 to receive from a user an input as to whether to use a multi-photographing mode. For example, the display 220 may display a sentence, "do you want to select a multi-photographing mode?" and a user may input a response regarding whether to use a multi-photographing mode to the input unit 230. If the input unit 230 includes a touch panel, the user may touch "yes" or "no" to input a user command, but this is only an example. The user may input a user command using other means, such as a button.

In response to a user inputting a user command not to select a multi-photographing mode to the input unit 230 and then inputting a photographing command to the input unit 230, the controller 290 controls the photographing unit 260 to photograph an image. The photographed image is a raw image which is not image-processed, and the storage 250 stores the raw image.

The controller 290 controls the display 220 to display the stored raw image, and a user may select a multi-photographing mode after checking the raw image displayed on the display 220.

In response to a user not selecting a multi-photographing mode after checking the raw image, the controller 290 controls the storage 250 to store the raw image as a final image.

In response to a user selecting a multi-photographing mode after checking the raw image, the controller 290 controls the display 220 to display the photographing mode selection UI 310. In response the user selecting a plurality of photographing modes through the photographing mode selection UI 310, the controller 290 sets a final setting value by using a photographing setting value of the plurality of selected photographing modes, and controls the image processor 270 to process the stored raw image according to the calculated final setting value.

The display 220 may display the processed raw image, and the storage 250 may store the processed raw image. The processed raw image may be stored when the raw image before processing is deleted, but this is only an example. The controller may control the storage 250 to store both the raw image before processing and after processing.

Meanwhile, the controller 290 may control the storage 250 to associate various photographing information detected by the detector 280 with a plurality of photographing modes selected by a user and may store the information. For example, in response to a user simultaneously selecting a portrait mode and a night-view mode from among a plurality of photographing modes in Seoul at 20:00 and photographs an image, the controller 290 may control the storage 250 to simultaneously associate the user selection of the portrait mode and the night-view mode with that the place and time of the photographing being Seoul and 20:00, and store the information.

In addition, in response to a determination that various photographing information detected by the detector 280 is the same as or similar to pre-stored photographing information prior to a user inputting a photographing command to the input unit 230, the controller 290 may recommend a plurality of pre-stored photographing modes. That is, in response to the detector detecting that the location of a user is Seoul and the time is around 20:00, the controller 290 may recommend to the user that the user select a portrait mode and a night-view mode from among the photographing modes. Specifically, the controller 290 may control the display 220 to display a recommended photographing mode.

In response to a user inputting a user command to select a multi-photographing mode to the input unit 230, the controller 290 controls the display 220 to display the photographing mode selection UI 310. Specifically, as illustrated in FIG. 3, the controller 290 may control the display 220 to display the photographing mode selection UI 310 which includes a plurality of items 310-1 to 310-10 corresponding to a plurality of photographing modes.

The photographing mode selection UI 310 may be displayed on the display 220, but this is only an example. The photographing mode selection UI 310 may be provided in the image photographing apparatus 200 in the form of one or more buttons, but is not limited thereto.

Figure 3:
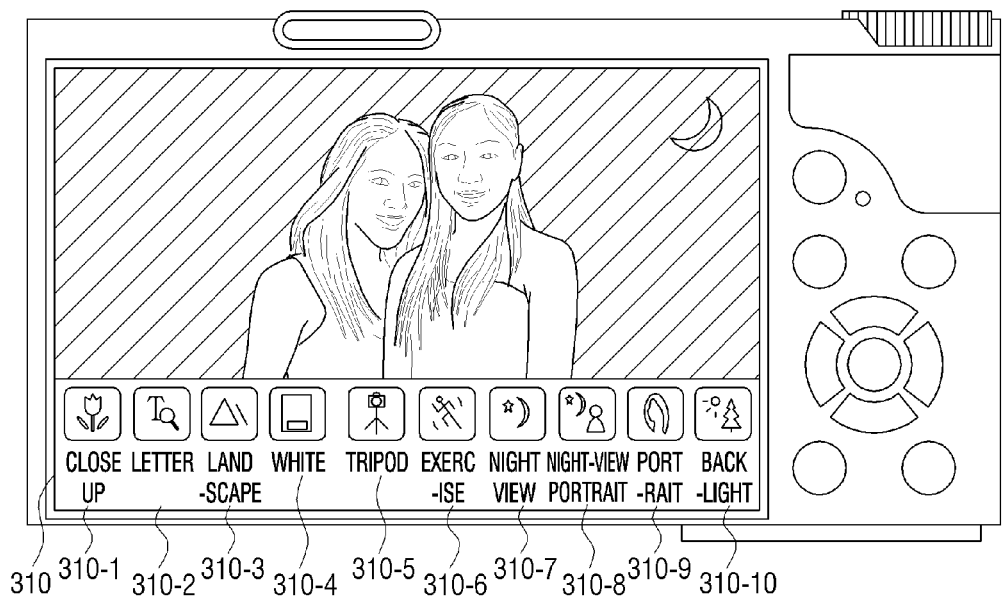
FIG. 3 is a view illustrating user interface to select a photographing mode of an image photographing apparatus, according to an exemplary embodiment.

The photographing modes illustrated in the photographing mode selection UI 310 are photographing modes which are generally most frequently selected by a user, and as illustrated in FIG. 3, may include a close-up mode 310-1, a letter mode 310-2, a landscape mode 310-3, a white mode 310-4, a tripod mode 310-5, an exercise mode 310-6, a night-view mode 310-7, a night portrait mode 310-8, a portrait mode 310-9, and a backlight mode, but these are only examples. Some of the photographing modes may be omitted, changed or added according to the type and attribute of an image photographing apparatus.

The image photographing apparatus 200 may store a setting value regarding various settings of the image photographing apparatus 100 which are appropriate to photograph an image in each photographing mode. Accordingly, in response to a user selecting a specific photographing mode from a plurality of photographing modes, the controller 290 controls the image processor 270 to perform image-processing with respect to an image photographed by the photographing unit 260 according to a pre-stored setting value.

Figure 4:
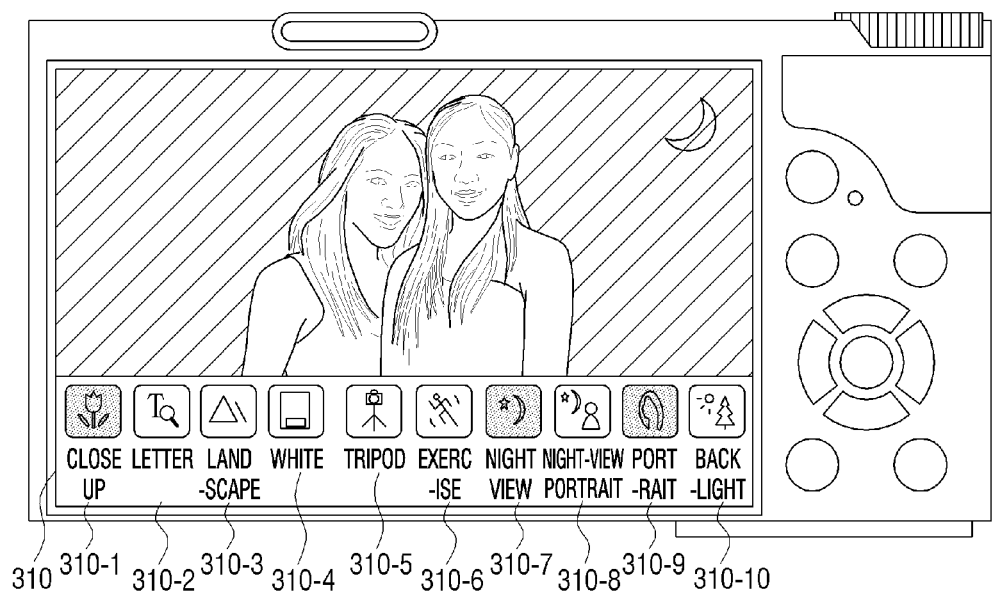
FIG. 4 is a view illustrating user interface to select a plurality of photographing modes, according to an exemplary embodiment.

In response to a user inputting a user command to select a multi-photographing mode to the input unit 230 or a predetermination is made that the image photographing apparatus 100 uses a multi-photographing mode, the user may input a user command to select a plurality of photographing modes from the photographing mode selection UI 310 to the input unit 230 as illustrated in FIG. 4. That is, the multi-photographing mode is a function of the image photographing apparatus 100 which allows a user to simultaneously select a plurality of photographing modes.

Accordingly, in response to a user inputting a user command to select a plurality of photographing modes from the photographing mode selection UI 310 to the input unit 230, the controller 290 resets necessary values of photographing by calculating the average values of those values which are set for each photographing mode. The necessary values for photographing which are reset may be stored in the storage 250.

In addition, the controller 290 may control the storage 250 to associate the photographing time, photographing place, and user motion at the time of photographing which are detected by the detector 280, with the plurality of photographing modes that the user inputs to the input unit 230, and store the information.

For example, as illustrated in FIG. 4, in response to a user inputting a user command to simultaneously select the close-up mode 310-1, the night-view mode 310-7, and the portrait mode 310-9 to the input unit 230, the controller 290 controls the image processor 280 to calculate the average value of setting values which are pre-stored in each mode and process an image photographed by the photographing unit 260.

In addition, in response to the detector 280 detecting that the location of a user is Seoul, a photographing time is around 20:00, and there is almost no motion of the user, the controller 290 may control the storage 250 to associate the photographing environment detected by the detector 280 and the close-up mode 310-1, the night-view mode 310-7 and the portrait mode 310-9 selected by the user, and store the information.

That is, in response to the detector 280 detecting that the location of a user is Seoul, a photographing time is around 20:00, and there is almost no motion of the user prior to the user photographing an image, the controller 290 may recommend that the user to input a user command to simultaneously select the close-up mode 310-1, the night-view mode 310-7 and the portrait mode 310-9 to the input unit 230 based on pre-stored information. Although not illustrated in the drawings, the controller 290 may control the display 220 to display a recommended photographing mode for a user and display a sentence asking whether to select the recommended photographing mode.

Figure 5:
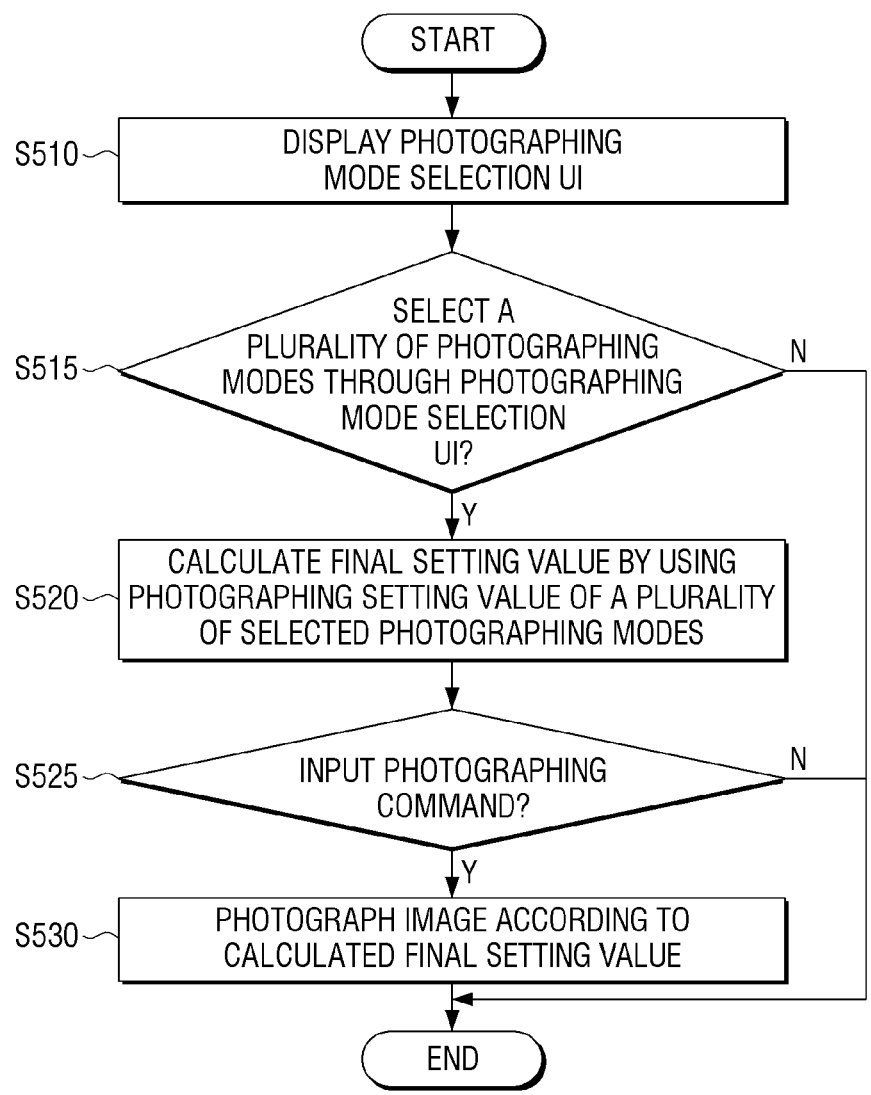

FIG. 5 is a flowchart provided to explain a photographing method of an image photographing apparatus, according to an exemplary embodiment.

First, the image photographing apparatus 200 displays the photographing mode selection UI 310 on the display 220 (S510). Specifically, the photographing mode selection UI 310 displays photographing modes which are most frequently selected by users, and may include a portrait mode, a landscape mode, a night-view mode, a close-up mode, a tripod mode, an exercise mode, a letter mode, and so on.

In addition, the image photographing apparatus 200 determines whether a user command to select a plurality of photographing modes on the photographing mode selection UI 310 is input to the input unit 230 (S515).

In response to a plurality of photographing modes being selected (S515-Y), the image photographing apparatus 200 calculates a final setting value using photographing setting values of the plurality of selected photographing modes (S520). The photographing setting values may include iris value, sensitivity, shutter speed, etc., which are adjustable when the image photographing apparatus 200 photographs an image.

The image photographing apparatus 200 provides photographing modes which are frequently used by users for user convenience, and the range of a photographing setting value is set for each photographing mode. Accordingly, in response to a user selecting at least one photographing mode, a final setting value may be calculated using a photographing setting value which is preset for each photographing mode. The final setting value may be calculated using the average value of the photographing setting value which is preset for each photographing mode, but this is only an example. The final setting value may be calculated using other calculation algorithms.

Further, the image photographing apparatus 100 determines whether a user inputs a photographing command to the input unit 230 (S525).

In response to a photographing command being input (S525-Y), an image is photographed according to the calculated final setting value (S530). That is, when the image processor 270 processes an image according to the calculated final setting value, the photographing unit 260 photographs an image.

Hereinafter, the photographing method of an image photographing apparatus according to an exemplary embodiment will be explained in detail with reference to FIG. 6.

First, the image photographing apparatus 100 determines whether a multi-photographing mode is selected (S600).

In response to a determination that a user command to select a multi-photographing mode being input to the input unit 230 (S600-Y), the image photographing apparatus 100 displays a photographing mode selection UI (S605).

Subsequently, it is determined whether a plurality of photographing modes are selected through the photographing mode selection UI (S610).

In response to a determination that a plurality of photographing modes are selected (S610-Y), a final setting value is set by using photographing setting values of the plurality of selected photographing modes (S615).

Subsequently, the image photographing apparatus 100 determines whether a user inputs a photographing command (S620).

In response to a determination that a photographing command is input (S620-Y), an image is photographed according to the calculated final setting value (S625).

In response to a determination that a user command not to select a multi-photographing mode is input (S600-N), it is determined whether a photographing command is input (S635).

In response to a determination that a photographing command is input (S635-Y), an image is photographed (S640).

Subsequently, a photographed raw image is stored (S645), and the stored raw image is displayed (S650). The raw image is an image which is not image-processed, and in response to a user not selecting a multi-photographing mode again after storing the raw image, the raw image may be stored as a final image. Alternatively, in response to a user selecting a multi-photographing mode again after storing the raw image, the raw image is image-processed and stored according to a plurality of selected photographing modes, and the stored raw image may be deleted. However, this is only an example, and both the raw image and the image-processed raw image may be stored in the storage 250.

Whether a multi-photographing mode is selected is determined again (S655), and in response to a determination that a user selects a multi-photographing mode (S655-Y), a photographing mode selection UI is displayed (S660).

The image photographing apparatus 100 determines whether a plurality of photographing modes are selected, through the photographing mode selection UI (S665).

In response to a determination that a plurality of photographing modes are selected (S665-Y), a final setting value is set by using photographing setting values of the plurality of selected photographing modes (S670), and the photographing mode selection UI is displayed (S675).

The stored raw image is processed according to the calculated final setting value (S675), and the processed raw image is displayed (S680).

As described above, according to various exemplary embodiments, a user may more easily and conveniently photograph an image which is appropriate for a photographing environment of the user.

The foregoing exemplary embodiments and advantages are merely exemplary and are not to be construed as limiting. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A photographing method of an image photographing apparatus, the photographing method comprising:
   displaying a photographing mode selection user interface (UI);
   in response to a plurality of photographing modes being selected through the photographing mode selection UI, determining a final setting value for capturing an image based on a photographing setting value of the plurality of selected photographing modes; and
   in response to a photographing command being input, photographing an image according to the determined final setting value,
   wherein the photographing setting value comprises iris value, sensitivity and shutter speed.

2. The photographing method as claimed in claim 1, further comprising:
   detecting a photographing environment; and
   in response to the photographing command being input, associating and storing the photographing environment which is detected in response to the photographing command with the plurality of selected photographing modes.

3. The photographing method as claimed in claim 2, further comprising:
   in response to the detected photographing environment being the same as a pre-stored photographing environment, recommending the plurality of selected photographing modes corresponding to the pre-stored photographing environment.

4. The photographing method as claimed in claim 2, wherein the photographing environment includes at least one of a photographing location, a photographing time, a photographing figure and a movement of an image photographing apparatus at a time of photographing.

5. The photographing method as claimed in claim 1, wherein the final setting value is an average value of the photographing setting value of the plurality of photographing modes.

6. The photographing method as claimed in claim 1, wherein the final setting value is a value which is determined by multiplying a different weighted value and each photographing setting value of the plurality of photographing modes and adding the determined values.

7. The photographing method as claimed in claim 1, further comprising:
   displaying an image which is photographed according to the determined final setting value.

8. The photographing method as claimed in claim 1, wherein each of the plurality of photographing modes comprises a plurality of setting parameters, and each of the plurality of setting parameters has different setting values.

9. An image photographing apparatus comprising:
   a photographing unit configured to photograph an image;
   a display configured to display the photographed image;
   an input unit configured to receive a user command; and
   a controller configured to control the display to display a photographing mode selection user interface (UI) in response to a predetermined user command being input through the input unit, determine a final setting value for capturing an image based on a photographing setting value of a plurality of selected photographing modes in response to a plurality of photographing modes being selected through the photographing mode selection UI, and control the photographing unit to photograph an image according to the determined final setting value in response to a photographing command being input through the input unit
   wherein the photographing setting value comprises iris value, sensitivity and shutter speed.

10. The image photographing apparatus as claimed in claim 9, further comprising:
    a detector configured to detect a photographing environment; and
    a storage,
    wherein the controller is configured to control the storage to associate and store the photographing environment which is detected through the detector in response to the photographing command with the plurality of selected photographing modes in response to the photographing command being input.

11. The image photographing apparatus as claimed in claim 10, wherein the controller is configured to recommend the plurality of selected photographing modes which correspond to a pre-stored photographing environment in response to a determination that the detected photographing environment is the same as a pre-stored photographing environment.

12. The image photographing apparatus as claimed in claim 11, wherein the photographing environment includes at least one of a photographing location, a photographing time, a photographing figure, a rotation angle of the image photographing apparatus and a movement of the image photographing apparatus at a time of photographing.

13. The image photographing apparatus as claimed in claim 9, wherein the final setting value is an average value of the photographing setting value of the plurality of photographing modes.

14. The image photographing apparatus as claimed in claim 9, wherein the final setting value is a value which is determined by multiplying a different weighted value and each photographing setting value of the plurality of photographing modes and adding the determined values.

15. An image photographing apparatus comprising:
    a photographing unit configured to photograph an image;
    a display configured to display the photographed image;
    an input unit configured to receive a user command; and
    a controller configured to control the display to display a photographing mode selection user interface (UI) which includes a plurality of photographing modes, wherein in response to a user simultaneously selecting a plurality of photographing modes through a user input command, the controller is configured to control the photographing unit to photograph an image,
    wherein a photographing setting value of the plurality of photographing modes comprises iris value, sensitivity and shutter speed.

16. The image photographing apparatus of claim 15, wherein the controller is configured to control the photographing of an image by calculating a setting value using the selected photographing modes.

17. The image photographing apparatus of claim 15, wherein the photographing modes include a close-up view, a landscape view, a tripod view, an exercise view, a night view, a portrait view and a backlight view.

18. The image photographing apparatus of claim 15, further comprising:
    a detector configured to detect a photographing environment; and
    a storage, wherein the controller is configured to control the storage to associate and store a photographing environment detected through a detector in response to a photographing command being input with the plurality of selected photographing modes.

19. The photographing method as claimed in claim 15, wherein each of the plurality of photographing modes comprises a plurality of setting parameters, and each of the plurality of setting parameters has different setting values.

20. A photographing method of an image photographing apparatus, the photographing method comprising:
    receiving a user command;
    in response to a photographing command being input, storing a photographed raw image captured in a single photographing mode;
    in response to a plurality of photographing modes being selected through a photographing mode selection user interface (UI) after photographing, determining a final setting value based on a plurality of photographing setting values corresponding to a setting parameter of the plurality of selected photographing modes; and processing and displaying the photographed raw image according to the determined final setting value, wherein each of the plurality of photographing, setting values comprises iris value, sensitivity and shutter speed.

\* \* \* \* \*